United States Patent
Uchida (10) Patent No.: US 7,529,555 B2
(45) Date of Patent: May 5, 2009

(54) TRANSMISSION RATE DETERMINATION METHOD, AND BASE STATION APPARATUS, TERMINAL APPARATUS, AND COMMUNICATION SYSTEM USING THE SAME

(75) Inventor: Yoshinori Uchida, Kakamigahara (JP)

(73) Assignee: Kyocera Corporation, Kyoto (JP)

( * ) Notice: Subject to any disclaimer, the term of this patent is extended or adjusted under 35 U.S.C. 154(b) by 993 days.

(21) Appl. No.: 10/849,214

(22) Filed: May 20, 2004

(65) Prior Publication Data

US 2004/0235508 A1 Nov. 25, 2004

(30) Foreign Application Priority Data

May 23, 2003 (JP) .............................. 2003-146052

(51) Int. Cl.
H04B 7/00 (2006.01)
(52) U.S. Cl. ....................................... 455/509; 370/338
(58) Field of Classification Search .......... 370/328–338
See application file for complete search history.

(56) References Cited

U.S. PATENT DOCUMENTS

2003/0081627 A1* 5/2003 Bao et al. ............... 370/329 X

FOREIGN PATENT DOCUMENTS

| JP | 11-41310 | 2/1999 |
| JP | 2002-290246 | 10/2002 |
| JP | 2003-51764 | 2/2003 |
| JP | 2003-152679 | 5/2003 |
| WO | WO 02/32083 A1 | 4/2002 |

OTHER PUBLICATIONS

Japanese Office Action issued in corresponding Japanese Patent Application No. JP 2003-146052, dated Aug. 1, 2006.

* cited by examiner

*Primary Examiner*—Philip J Sobutka
(74) *Attorney, Agent, or Firm*—Morrison & Foerster LLP (57) ABSTRACT

The modulation/demodulation unit modulates information to be transmitted, or demodulates information received. The time slot control unit allocates time slots to the terminal apparatus. The control signal processing unit extracts a signal indicating a disconnection request from a signal for requesting time slot allocation, received from the terminal apparatus in an inactive state in particular. The modulation mode control unit determines a modulation mode suitable for channel quality derived by the quality derivation unit. The modulation mode control unit determines to use a predetermined modulation mode when it receives an instruction for performing disconnection from the control signal processing unit.

7 Claims, 10 Drawing Sheets

| D/U | MODULATION MODE |
|---|---|
| A AND ABOVE | 16QAM |
| A - B | QPSK |
| BELOW B | BPSK |

| USER ID | ALLOCATED SLOTS | MODULATION MODE (UP) | MODULATION MODE (DOWN) |
|---|---|---|---|
| AABBCCDD | #2, #6 | 16QAM | 16QAM |
| EFGHIJKL | #3, #7 | QPSK | QPSK |
| MMNNOOPP | #4, #8 | QPSK | QPSK |
| QRSTUVWX | #2, #6 | QPSK | QPSK |
| HGFEDCBA | #3, #7 | 16QAM | 16QAM |
| LLKKJJII | #4, #8 | 16QAM | 16QAM |
| TSRQPONM | — | — | — |

FIG.10

TRANSMISSION RATE DETERMINATION METHOD, AND BASE STATION APPARATUS, TERMINAL APPARATUS, AND COMMUNICATION SYSTEM USING THE SAME

BACKGROUND OF THE INVENTION

1. Field of the Invention

The present invention relates to a transmission rate determination technology. In particular, the invention relates to a transmission rate determination method for changing a transmission rate during communication, and a base station apparatus, a terminal apparatus, and a communication system using the same.

2. Description of the Related Art

In wireless communication systems, transmission channels vary with time. Among technologies for increasing the transmission rate in such channel environment is adaptive modulation scheme. The adaptive modulation scheme controls its modulation mode in accordance with the channel environment. For example, if the channel environment is determined to be unfavorable, a modulation mode of high reliability is used for data transmission. If the channel environment is determined to be favorable, on the other hand, a modulation mode of high information volume is used for data transmission. When a base station apparatus and a terminal apparatus included in a wireless communication system communicate by TDD (Time Division Duplex) scheme, slots are typically transmitted for an up link and a down link alternately in regular order.

Each of the slots contains a preamble to be used for estimating the channel environment, modulation mode information indicating the modulation mode used for transmission, and information symbols. When the transmission channels of TDD scheme are reversible, the base station apparatus receives a slot, detects the C/N (Carrier to Noise Ratio) of the transmission channels, delay spread of the transmission channels and so on from received level information including a received baseband signal and RSSI (Received Signal Strength Indicator), and estimates the channel environment at the next timing of transmission. Besides, based on this estimation result, the base station apparatus selects a modulation mode to be used for transmission (See reference (1) in the following Related Art List, for instance).

Related Art List
(1) Japanese Patent Application Laid-Open No. 2002-290246.

Under the circumstances, the inventor has become aware of the following problems. When the adaptive modulation processing is performed, the transmission rate ideally becomes suitable for the channel quality. Nevertheless, the actual channel environment is fluctuating due to such reasons as the movement of the terminal apparatus, and suitable modulation modes may differ between when the channel quality is measured and when signals are transmitted actually. In particular, if the channel quality upon actual signal transmission degrades from when measured, the transmission of signals by using the modulation mode determined from the measured transmission quality can cause transmission errors easily.

The information to be communicated between the base station apparatus and the terminal apparatus includes not only data signals but also important information to control communication, such as a disconnection request from the terminal apparatus and an emergency message. Such important information is typically retransmitted when it causes a transmission error because of the communication using a modulation mode unsuitable for the actual channel quality. When the information is of extreme urgency, a larger transmission delay caused by the retransmitting can sometimes affect the control of the entire communication system. The retransmitting of the information also lowers the transmission efficiency.

SUMMARY OF THE INVENTION

In view of the foregoing, the inventor has achieved the prevent invention. It is an object of the present invention to provide a transmission rate determination technology, and a base station apparatus, a terminal apparatus, and a communication system using the same, whereby information necessary for predetermined processing is transmitted with reliability even in the case of communicating at variable transmission rates.

One of the aspects of the present invention is a base station apparatus. This apparatus comprises: a communication unit which communicates with a predetermined terminal apparatus at variable transmission rates; a detection unit which detects, out of signals received from the terminal apparatus, a request signal for communicating information of high priority during part of a communication period with the terminal apparatus, and further analyzes the contents of the request signal detected; and a transmission rate determination unit which determines a transmission rate for the terminal apparatus during the part of the communication period with the terminal apparatus, based on the contents of the request signal for communicating information of high priority.

When the request signal for communicating information of high priority, detected by the detection unit is a signal indicating a request for communication disconnection, the transmission rate determination unit may determine the transmission rate for the terminal apparatus to be a transmission rate of higher error tolerance.

Since the apparatus described above determines the transmission rate based on the contents of the request signal, it is possible to transmit information of high priority with reliability at the transmission rate of higher error tolerance.

Another aspect of the present invention is also a base station apparatus. This apparatus comprises: a communication unit which communicates with a predetermined terminal apparatus at variable transmission rates; a detection unit which detects, out of signals received from the terminal apparatus, a request signal for communicating information of high priority during part of a communication period with the terminal apparatus; a channel quality derivation unit which derives channel quality with respect to the terminal apparatus; and a transmission rate determination unit which determines a transmission rate for the terminal apparatus during the part of the communication period with the terminal apparatus, based on either of the derived channel quality and a predetermined transmission rate depending on the presence or absence of the request signal for communicating information of high priority.

The "presence or absence of the request signal" covers not only whether or not the request signal is present, but also a difference in the value of a flag included in the request signal. What is essential may be that the contents of the request signal be distinguishable.

Since the apparatus described above determines the transmission rate depending on the presence or absence of the request signal, it is possible to transmit information by using a predetermined modulation mode in the presence of the request signal while performing ordinary adaptive modulation in the absence of the request signal.

Still another aspect of the present invention is a terminal apparatus. This apparatus comprises: a communication unit which communicates with a predetermined base station apparatus at variable transmission rates; and a signal input unit which inputs a request signal for communicating information of high priority during part of a communication period with the base station apparatus if needed, the request signal being consulted by the base station apparatus to determine a transmission rate. In this apparatus, the communication unit may communicate during the part of the period at the transmission rate determined by the base station apparatus.

The apparatus described above can communicate information of high priority by using a modulation mode that is determined based on the request signal generated.

Still another aspect of the present invention is a communication system. This communication system comprises a terminal apparatus and a base station apparatus which communicates with the terminal apparatus at variable transmission rates. In this communication system, the terminal apparatus may transmit a request signal for communicating information of high priority during part of a communication period with the base station apparatus if needed. The base station apparatus may determine a transmission rate for the terminal apparatus during the part of the period depending on the presence or absence of the request signal for communicating information of high priority, received from the terminal apparatus.

The communication system described above can achieve priority-based communications depending on the presence or absence of the request signal.

Still another aspect of the present invention is a terminal apparatus. This apparatus comprises: a communication unit which communicates with a predetermined base station apparatus; a timing acquisition unit which acquires, from a signal received by the communication unit, the timing when the base station apparatus measures a signal intensity to determine a transmission rate; and an intensity adjusting unit which adjusts the intensity of a signal to be transmitted by the communication unit. In this apparatus, the intensity adjusting unit may reduce the signal to be transmitted in intensity at the acquired timing when the base station apparatus measures the signal intensity.

Since the apparatus described above transmits the signal of reduced intensity at the timing when the base station apparatus measures the signal intensity, it is possible to preadjust the measurement of the signal intensity in the base station apparatus.

Still another aspect of the present invention is also a terminal apparatus. This apparatus comprises: a communication unit which communicates with a predetermined base station apparatus at variable transmission rates; a channel quality measurement unit which measures channel quality with respect to the base station apparatus; a transmission rate derivation unit which derives and determines a transmission rate candidate for the base station apparatus based on the channel quality measured; and a signal generation unit which generates a request signal for communicating information of high priority during part of a communication period with the base station apparatus if needed. In this apparatus, the communication unit may transmit either a transmission rate lower than or equal to the transmission rate candidate derived or the transmission rate candidate derived to the base station apparatus as a transmission rate to be requested for the part of the period, depending on the presence or absence of the request signal for communicating information of high priority.

In communicating information of high priority, the apparatus described above requests of the base station apparatus a transmission rate lower than or equal to the transmission rate candidate derived. This makes it possible to control the transmission rate.

Still another aspect of the present invention is a transmission rate determination method. This method comprises: detecting, out of signals received from a terminal apparatus to communicate with at variable transmission rates, a request signal for communicating information of high priority during part of a communication period with the terminal apparatus, if any, and further analyzing contents of the request signal detected; and determining a transmission rate for the terminal apparatus during the part of the communication period with the terminal apparatus, based on the contents of the request signal.

Still another aspect of the present invention is also a transmission rate determination method. This method comprises: detecting, out of signals received from a terminal apparatus to communicate with at variable transmission rates, a request signal for communicating information of high priority during part of a communication period with the terminal apparatus, if any; deriving channel quality with respect to the terminal apparatus; and determining a transmission rate for the terminal apparatus during the part of the communication period with the terminal apparatus, based on either of the derived channel quality and a predetermined transmission rate depending on the presence or absence of the request signal.

When the request signal for communicating information of high priority in the step of detecting a request signal is a signal indicating a request for communication disconnection, the step of determining a transmission rate may determine the transmission rate for the terminal apparatus to be a transmission rate of higher error tolerance.

Still another aspect of the present invention is a program. This program comprises: detecting, out of signals received over a wireless network from a terminal apparatus to communicate with at variable transmission rates, a request signal for communicating information of high priority during part of a communication period with the terminal apparatus, if any, and further analyzing contents of the request signal detected; and determining a transmission rate for the terminal apparatus during the part of the communication period with the terminal apparatus, based on the contents of the request signal.

Still another aspect of the present invention is also a program. This program comprises: detecting, out of signals received over a wireless network from a terminal apparatus to communicate with at variable transmission rates, a request signal for communicating information of high priority during part of a communication period with the terminal apparatus, if any; deriving channel quality with respect to the terminal apparatus; and determining a transmission rate for the terminal apparatus during the part of the communication period with the terminal apparatus, based on either of the derived channel quality and a predetermined transmission rate previously stored in a memory depending on the presence or absence of the request signal.

When the request signal for communicating information of high priority in the step of detecting a request signal is a signal indicating a request for communication disconnection, the step of determining a transmission rate may determine the transmission rate for the terminal apparatus to be a transmission rate of higher error tolerance than the one stored in the memory.

It is to be noted that any arbitrary combination of the above-described structural components and expressions changed between a method, an apparatus, a system, a recording medium, a computer program and so forth are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

First Embodiment

A first embodiment relates to a communication system in which a base station apparatus allocates time slots to a terminal apparatus to communicate with, and adaptive modulation is performed between the terminal apparatus and the base station apparatus. In the case assumed, the base station apparatus has once established connection with the terminal apparatus and then freed the time slots while maintaining upper layers of the communication protocol in connection for such reasons as the absence of data to communicate (hereinafter, referred to as "inactive state"). Processing for disconnecting the communication from the inactive state is performed on that the terminal apparatus requests of the base station apparatus time slot allocation again, and time slots are allocated by the base station apparatus.

When the terminal apparatus of the present embodiment requests the base station apparatus time slot allocation for executing the disconnection processing, it also transmits a disconnection request simultaneously. The base station apparatus allocates time slots to the terminal apparatus, and when acquiring the disconnection request, conducts communication with this terminal apparatus by using a predetermined modulation mode of high error tolerance without adaptive modulation. As a result, by the modulation mode of high error tolerance, the processing of disconnecting the terminal apparatus is executed with higher reliability.

Figure 1:
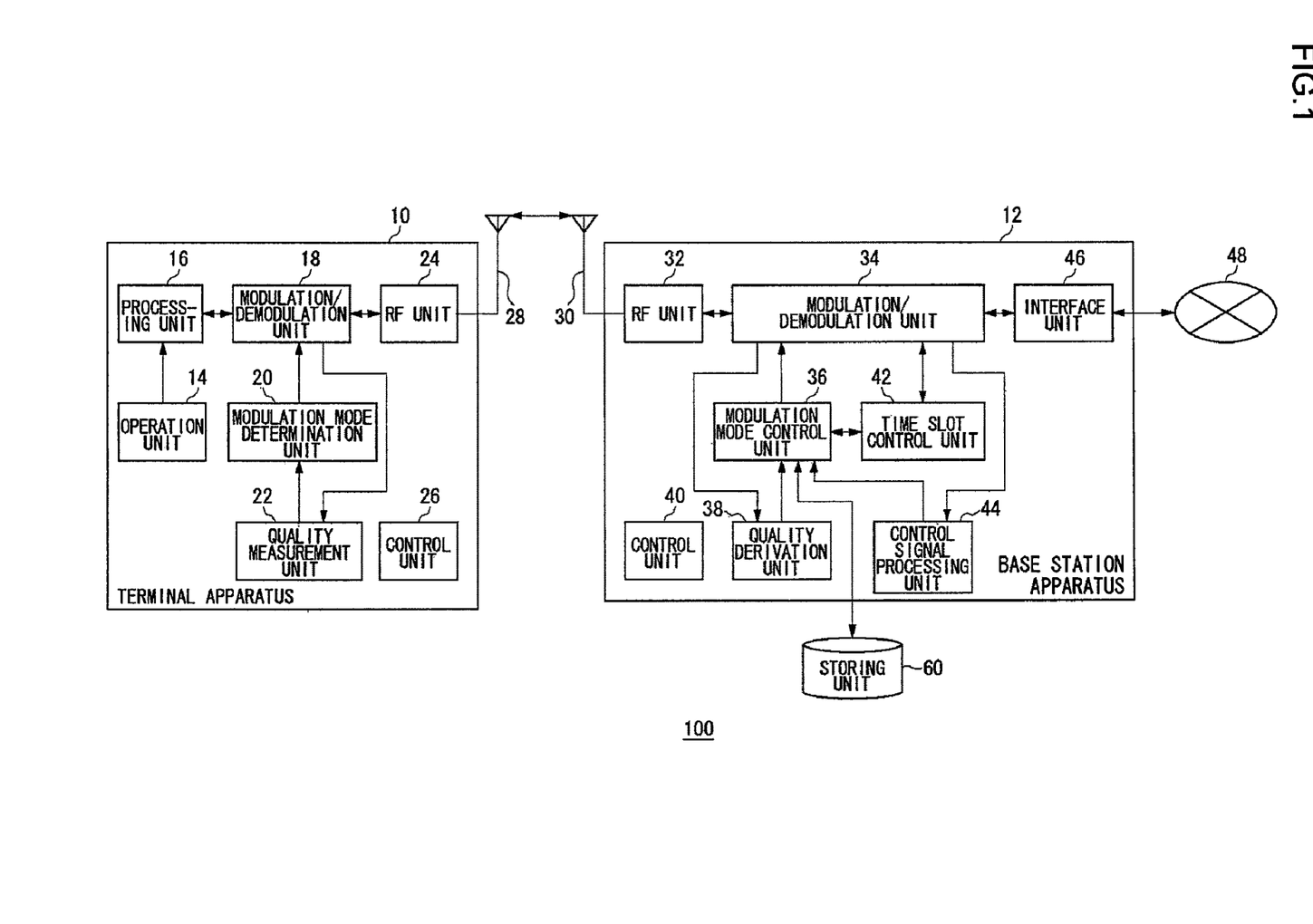
FIG. 1 shows a structure of a communication system according to a first embodiment.

FIG. 1 shows a communication system 100 according to the first embodiment. The communication system 100 includes a terminal apparatus 10, a base station apparatus 12, and a network 48. The terminal apparatus 10 includes an operation unit 14, a processing unit 16, a modulation/demodulation unit 18, a modulation mode determination unit 20, a quality measurement unit 22, an RF unit 24, a control unit 26, and a terminal antenna 28. The base station apparatus 12 includes a base station antenna 30, an RF unit 32, a modulation/demodulation unit 34, a modulation mode control unit 36, a quality derivation unit 38, a control unit 40, a time slot control unit 42, a control signal processing unit 44, an interface unit 46, and a storing unit 60.

The operation unit 14 is an interface for inputting data from exterior of the terminal apparatus 10, and corresponds to a link disconnection button, for example. When the terminal apparatus 10 is connected with a personal computer (hereinafter, referred to as "PC") in use, the PC may include a button for issuing an instruction for link disconnection. In this case, the operation unit 14 simply receives the signal for giving an instruction for link disconnection.

The processing unit 16 changes the signal that is input from the operation unit 14 into a signal that can be modulated by the modulation/demodulation unit 18 to be described later. When the processing unit 16 in an inactive state receives the signal for giving an instruction for link disconnection from the operation unit 14, it generates a signal indicating a disconnection request to be transmitted to the base station apparatus 12 to be described later. When the received data contains some error, the processing unit 16 performs retransmission processing. Moreover, when the terminal apparatus 10 has an error correcting function, the processing unit 16 encodes information to be transmitted and decodes information received.

The modulation/demodulation unit 18 modulates information to be transmitted, or demodulates information received. Here, the modulation/demodulation unit 18 shall handle any of BPSK (Binary Phase Shift Keying), π/4-shift QPSK (Quadrature Phase Shift Keying), and 16 QAM (16 Quadrature Amplitude Modulation) In addition, the modulation mode shall be changed adaptively. Demodulation involves coherent detection for 16 QAM, and differential detection for BPSK and π/4-shift QPSK. Incidentally, the modulation mode is determined by the base station apparatus 12 to be described later. The modulation/demodulation unit 18 exercises processing corresponding to the determined modulation mode according to a predetermined instruction signal from the base station apparatus 12.

The quality measurement unit 22 measures the quality of the received signal as appropriate. The quality of the received signal may be arbitrary. Here, the signal demodulated by the modulation/demodulation unit 18 or RSSI is measured for the intensity of a desired signal received, the intensity of an interference signal received, the intensity ratio between the desired signal and the interference signal, etc. The signal demodulated by the modulation/demodulation unit 18 may be measured for error ratios.

The modulation mode determination unit 20 determines, from the signal quality measured by the quality measurement unit 22, the modulation mode corresponding to the measured quality, and generates a signal for notifying the base station apparatus 12 of the modulation mode determined. For example, assuming that the signal quality is the intensity ratio between the desired signal and the interference signal, a first reference value and a second reference value are defined and stored in advance such that the first reference value has a level higher than that of the second reference value. If the measured intensity ratio is higher than or equal to the first reference value, the modulation mode is determined to be 16 QAM. If the measured intensity ratio is lower than the first reference value and higher than or equal to the second reference value, the modulation mode is determined to be π/4-shift QPSK. If the measured intensity ratio is lower than the second reference value, the modulation mode is determined to be BPSK.

The RF unit 24 performs frequency conversion between baseband signals to be processed by the modulation/demodulation unit 18 and radio frequency signals, amplification, AD or DA conversion.

The terminal antenna 28 transmits and receives the radio frequency signals. Incidentally, the terminal antenna 28 may be any of a nondirectional antenna, a predetermined directional antenna, and an adaptive array antenna. Diversity facilities may also be provided.

The control unit 26 performs timing processing of the terminal apparatus 10, processing of control signals, etc.

The base station antenna 30 transmits and receives radio frequency signals as with the terminal antenna 28. The base station antenna 30 may also be any of a nondirectional antenna, a predetermined directional antenna, and an adaptive array antenna. Diversity facilities may also be provided.

The RF unit 32 performs frequency conversion between baseband signals to be processed by the modulation/demodulation unit 34 to be described later and the radio frequency signals, amplification, AD or DA conversion.

The modulation/demodulation unit 34 modulates information to be transmitted, or demodulates information received. The modulation mode is selected from among BPSK, π/4-shift QPSK, and 16 QAM adaptively. While only a single terminal apparatus 10 is shown here, a plurality of terminal apparatuses 10 can be connected, in which case modulation and demodulation are performed in units of each terminal apparatus 10.

The interface unit 46 is in charge of establishing connection between the base station apparatus 12 and the network 48. The interface unit 46 converts a format of information to be modulated by the modulation/demodulation unit 34 and a format of information demodulated by the modulation/demodulation unit 34 into/from a format of information to be communicated over the network 48. An example of the network 48 is an ISDN (integrated Services Digital Network). Here, the interface unit 46 shall have a physical configuration corresponding to the ISDN.

The time slot control unit 42 allocates time slots to the terminal apparatus 10 when the base station apparatus 12 establishes connection with the terminal apparatus 10. The time slot control unit 42 then notifies the modulation/demodulation unit 34 and the modulation mode control unit 36 of the time slots allocated. It also manages the time slots allocated to the terminal apparatus 10.

The control signal processing unit 44 extracts control signals from the received signal, and processes these control signals. The control signals include the signal indicating a disconnection request and the signal for notifying of the modulation mode described previously, and a signal for requesting new connection. In particular, when the modulation/demodulation unit 34 receives a signal for requesting time slot allocation from the target terminal apparatus 10 in the inactive state, the control signal processing unit 44 extracts the signal indicating a disconnection request from the signal for requesting time slot allocation. The control signal processing unit 44 outputs the result of processing to the modulation mode control unit 36 to be described later as an instruction for performing disconnection. Incidentally, the signal indicating a disconnection request may be represented by the value of a predetermined FLAG included in the signal for requesting time slot allocation. For example, the FLAG of "1" may represents a disconnection request, and "0" a communication request.

The quality derivation unit 38 measures the quality of the received signal as that of the up-link signal. As with the quality measurement unit 22, the quality of the received signal includes the intensity of a desired signal received, the intensity of an interference signal received, and the intensity ratio between the desired signal and the interference signal, which are measured of the signal or RSSI demodulated by the modulation/demodulation unit 34. For the quality of the down-link signal, information on the modulation mode determined by the modulation mode determination unit 20 is detected out of the signal received from the terminal apparatus 10. As an alternative to the information on the modulation mode determined by the modulation mode determination unit 20, the signal quality measured by the quality measurement unit 22 may be used. When the base station apparatus 12 is connected with a plurality of terminal apparatuses 10, the foregoing processing is performed in units of each terminal apparatus 10.

Figure 2:
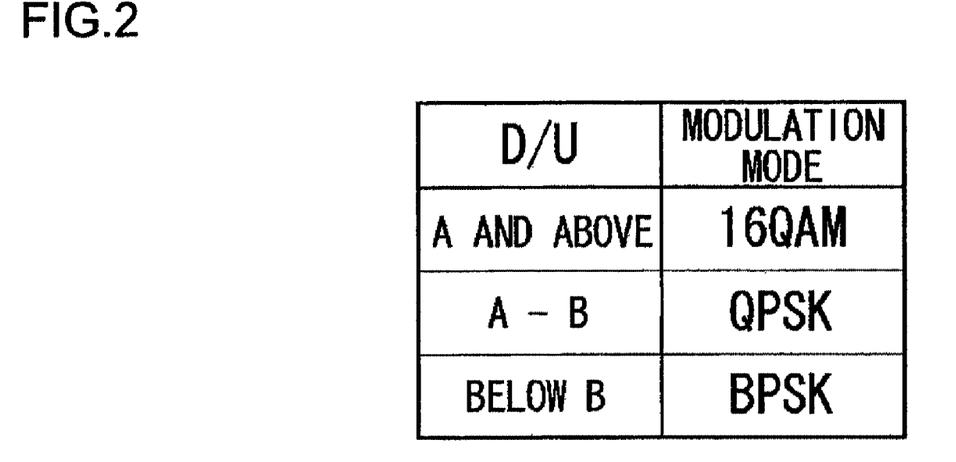
FIG. 2 shows a data structure of a storing unit of FIG. 1.

The modulation mode control unit 36 determines a modulation mode suitable for the quality of the up-link signal measured by the quality derivation unit 38 and the quality of the down-link signal detected by the quality derivation unit 38, respectively. When the signal quality is the intensity ratio between the desired signal and the interference signal, the modulation mode control unit 36 compares the intensity ratio between the desired signal and the interference signal with reference values previously stored in the storing unit 60 and determines the modulation mode. FIG. 2 shows the data structure of the storing unit 60. Here, like the modulation mode determination unit 20 described above, the storing unit 60 has two reference values, or "A" and "B."

If the measured intensity ratio between the desired signal and the interference signal is higher than or equal to "A," the modulation mode is determined to be 16 QAM. If the measured intensity ratio between the desired signal and the interference signal is lower than "A" and higher than or equal to "B," the modulation mode is determined to be π/4-shift QPSK. If the measured intensity ratio between the desired signal and the interference signal is lower than "B," the modulation mode is determined to be BPSK. Furthermore, when the modulation mode control unit 36 receives an instruction for performing disconnection from the control signal processing unit 44, it determines to use a predetermined modulation mode, ignoring the change of the modulation mode determined as described above. Here, the predetermined modulation mode shall be BPSK which has the highest error tolerance.

The control unit 40 performs timing processing of the base station apparatus 12, processing of control signals, etc.

In terms of hardware, the above-described structure can be realized by a CPU, a memory and other LSIs of an arbitrary computer. In terms of software, it is realized by memory-loaded programs having reserve-manage functions or the like, but drawn and described here are function blocks that are realized in cooperation with those. Thus, it is understood by those skilled in the art that these functional blocks can be realized in a variety of forms by hardware only, software only or the combination thereof.

Figure 3:
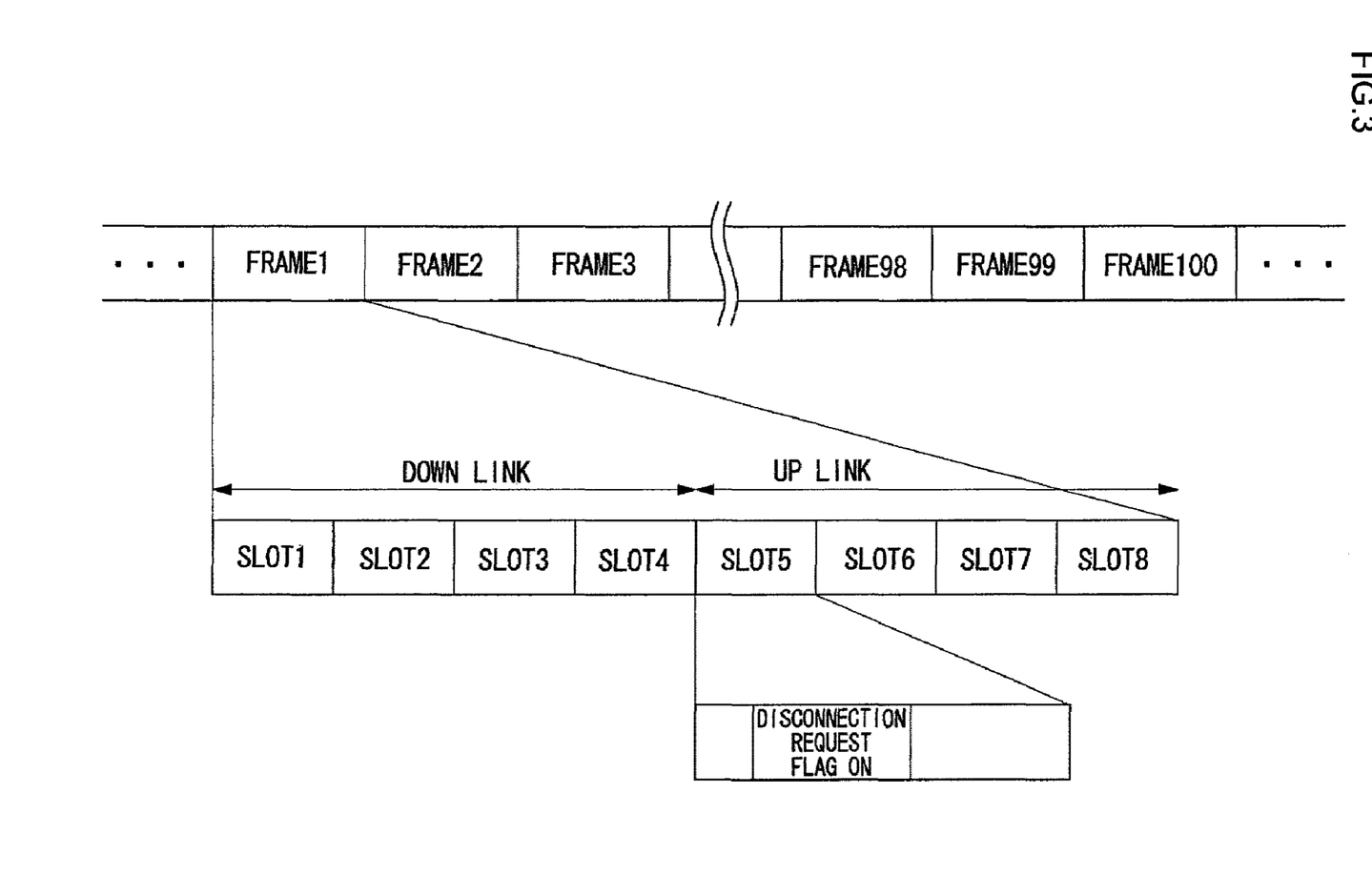
FIG. 3 shows a frame format according to the first embodiment.

FIG. 3 shows a frame format according to the first embodiment. In this frame format, a plurality of frames are arranged in succession. Here, these frames are represented as "frame 1" to "frame 100," whereas not-shown other frames are also arranged in front and behind. Each single frame consists of eight time slots, which is the same configuration as that of the Personal Handyphone System. Here, these slots are represented as "slot 1" to "slot 8."

Of the eight time slots, four time slots or "slot 1" to "slot 4" are used for a down link. The remaining four, or "slot 5" to "slot 8," are used for an up link. The up-link slot 5 for the terminal apparatus 10 to transmit to the base station apparatus 12 contains a "disconnection request FLAG," or the signal indicating the disconnection request described above. Here, the "disconnection request FLAG" is "ON."

Figure 4:
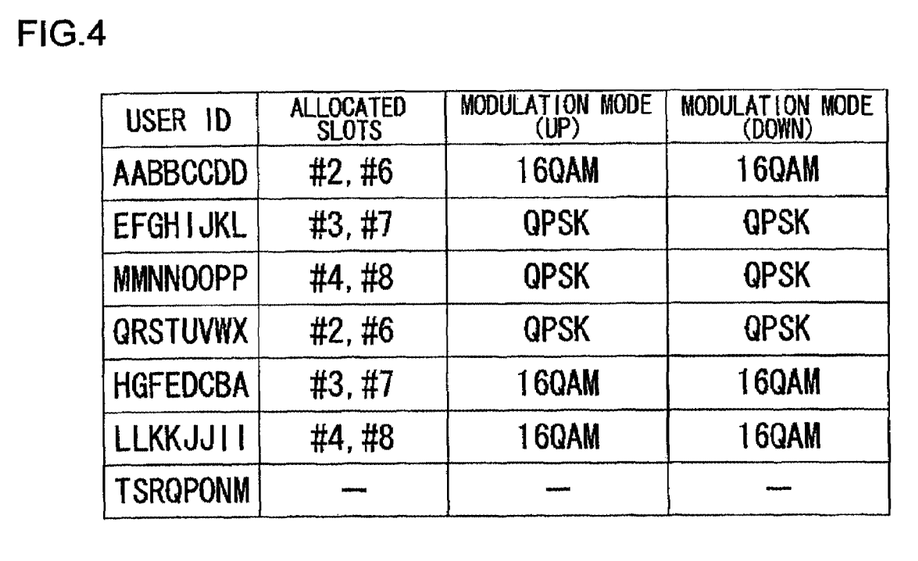
FIG. 4 shows a data structure of a time slot control unit of FIG. 1.

FIG. 4 shows the data structure of allocated time slots to be managed by the time slot control unit 42. The "USER ID" field shows symbols for identifying terminal apparatuses 10. Here, the terminal apparatuses 10 are identified by alphabetical symbols like "AABBCCDD." Numerals may be used, however. Telephone numbers given to the terminal apparatuses 10 may also be used. The "ALLOCATED SLOTS" field shows time slots allocated to each terminal apparatus 10. For example, "#2, #6" shows that the "slot 2" is allocated for the down link and the "slot 6" for the up link. A plurality of time slots may be allocated to each of the up and down links. The user ID "TSRQPONM" in the bottom row shows an inactive state. The "MODULATION MODE (UP)" field shows the modulation modes currently used for the up links. The "MODULATION MODE (DOWN)" field shows the modulation modes currently used for the down links.

Figure 5:
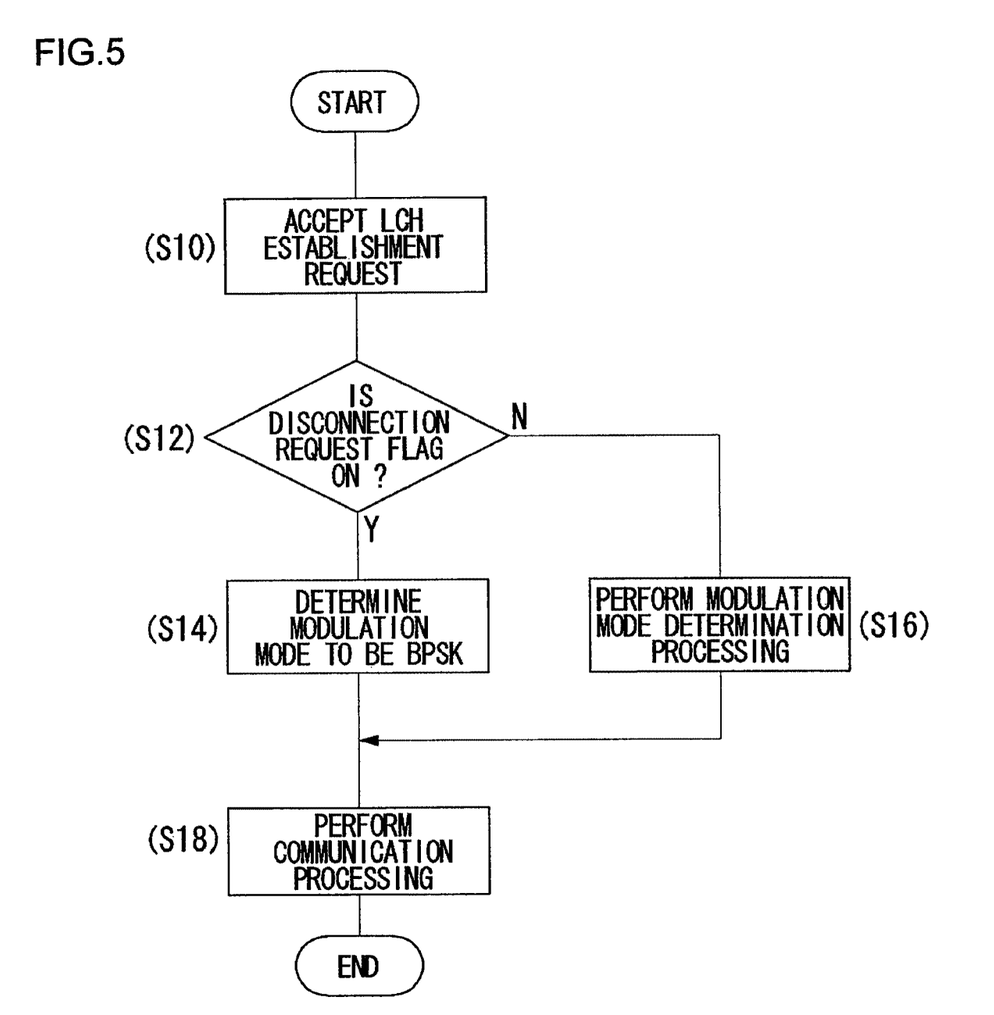
FIG. 5 is a flowchart showing the procedure for determining a modulation mode of FIG. 1.

FIG. 5 is a flowchart showing the procedure for determining a modulation mode. Here, the target terminal apparatus 10 shall be in an inactive state at present. The time slot control unit 42 or the control signal processing unit 44 accepts an LCH (Link CHannel) establishment request from the terminal apparatus 10 (S10). The control signal processing unit 44 checks the value of the disconnection request FLAG included in the LCH establishment request. If the disconnection request FLAG is ON (Y at S12), the modulation mode control unit 36 determines the modulation mode to be the predetermined one, or BPSK (S14). On the other hand, if the disconnection request FLAG is not ON (N at S12), the modulation mode control unit 36 determines the modulation mode based on the channel quality derived by the quality derivation unit 38 (S16). The modulation/demodulation unit 34 performs communication processing by using the modulation mode determined (S18).

Figure 6:
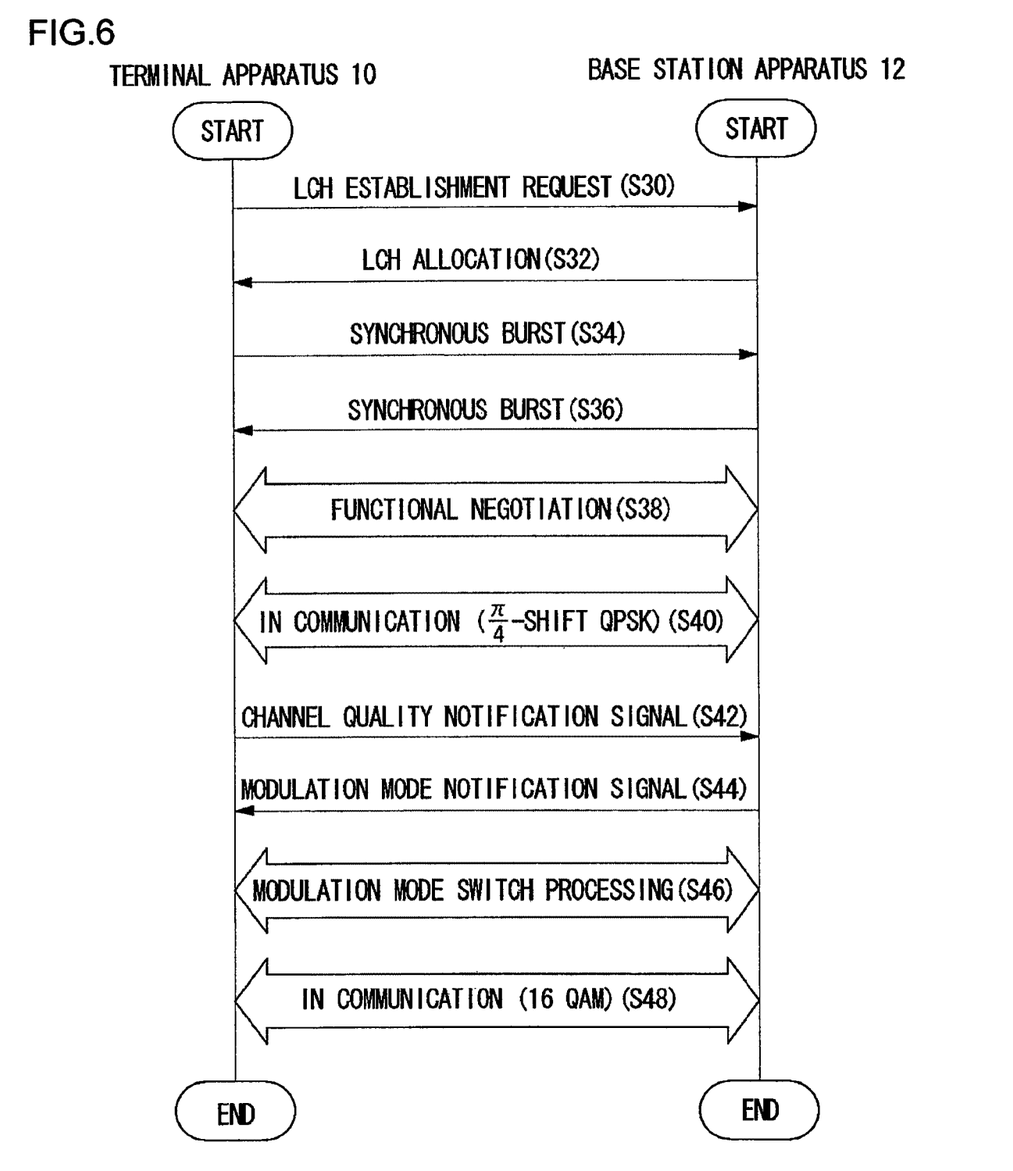
FIG. 6 is a sequence diagram showing communication start processing and modulation mode change processing of FIG. 1.

FIG. 6 is a sequence diagram showing communication start processing and modulation mode change processing. The processing does not involve link disconnection, but corresponds to preprocessing for link disconnection. The terminal apparatus 10 outputs the LCH establishment request in order to establish a new connection with the base station apparatus 12 (S30). When the time slot control unit 42 of the base station apparatus 12 allocates time slots, i.e., an LCH to this terminal apparatus 10, it outputs an LCH allocation to the terminal apparatus 10 (S32). To establish synchronization at upper layers of the communication protocol, the terminal apparatus 10 outputs a synchronous burst to the base station apparatus 12 by using the time slot allocated (S34). The base station apparatus 12 outputs a synchronous burst response to the terminal apparatus 10 (S36).

When it becomes possible for the terminal apparatus 10 and the base station apparatus 12 to exchange predetermined information therebetween, the terminal apparatus 10 and the base station apparatus 12 perform functional negotiations including the processing for exchanging information on processible modulation modes (S38). The terminal apparatus 10 and the base station apparatus 12 initially communicate by using predetermined π/4-shift QPSK (S40). This stage does not involve adaptive modulation since no processing as to channel quality is performed yet. The terminal apparatus 10 transmits the channel quality measured by the quality measurement unit 22 to the base station apparatus 12 as a channel quality notification signal (S42). The modulation mode control unit 36 transmits the determined modulation mode to the terminal apparatus 10 as a modulation mode notification signal (S44). To switch the modulation mode, the terminal apparatus 10 and the base station apparatus 12 perform modulation mode switch processing therebetween, including resynchronization processing (S46). Subsequently, the terminal apparatus 10 and the base station apparatus 12 communicate by using 16 QAM (S48).

Figure 7:
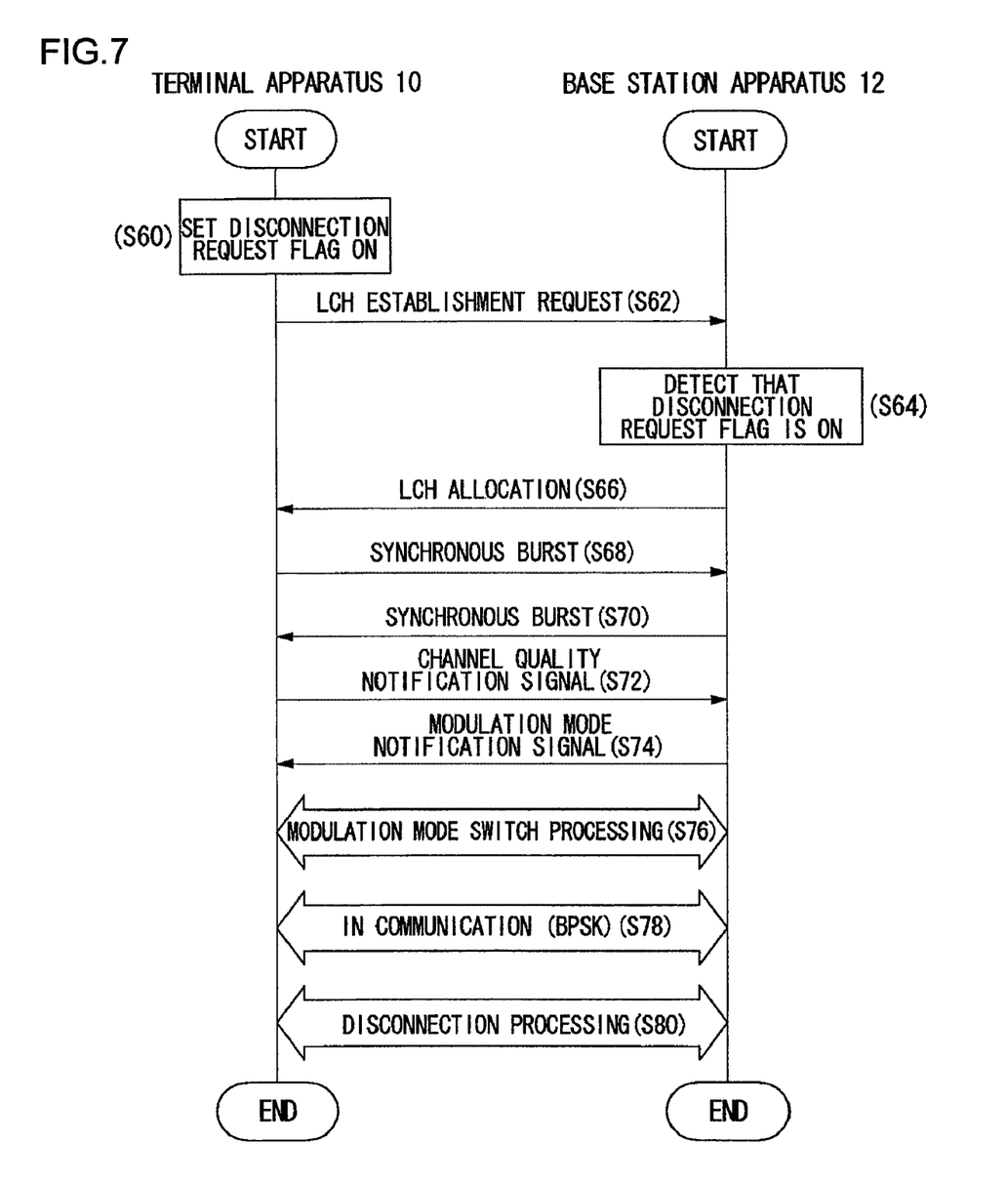
FIG. 7 is a sequence diagram showing disconnection processing of FIG. 1.

FIG. 7 is a sequence diagram showing the disconnection processing. Here, the terminal apparatus 10 shall be in an inactive state. The processing unit 16 sets the disconnection request FLAG to "ON" under the instruction of the operation unit 14 (S60). The terminal apparatus 10 outputs an LCH establishment request to the base station apparatus 12 (S62). The control signal processing unit 44 detects that the disconnection request FLAG is "ON" (S64). The base terminal apparatus 12 outputs an LCH allocation to the terminal apparatus 10 (S66). To establish synchronization at upper layers of the communication protocol, the terminal apparatus 10 outputs a synchronous burst to the base station apparatus 12 (S68). The base station apparatus 12 outputs a synchronous burst response to the terminal apparatus 10 (S70).

As with ordinary data communication, the terminal apparatus 10 measures channel quality which is necessary for adaptive modulation, and transmits it to the base station apparatus 12 as a channel quality notification signal (S72). Since the disconnection request FLAG is "ON," the modulation mode control unit 36 determines the modulation mode to be the predetermined BPSK, and transmits the modulation mode notification signal to the terminal apparatus 10 (S74). To switch the modulation mode, the terminal apparatus 10 and the base station apparatus 12 perform modulation mode switch processing therebetween, including resynchronization processing (S76). Subsequently, the terminal apparatus 10 and the base station apparatus 12 conduct communication by using BPSK (S78). Then, the terminal apparatus 10 performs disconnection processing (S80).

Here, the processing of step S62 to step S78 corresponds to the processing of restoring the terminal apparatus 10 from the inactive state, except that the processing of steps S60 and S64 is added and the modulation mode notified at step S74 is the predetermined modulation mode. That is, the terminal apparatus 10 performs the additional processing of generating the disconnection request FLAG, and the base station apparatus 12 performs the additional processing for the case where the disconnection request FLAG is "ON." This allows processing of higher stability through the same processing as that of the restoration from the inactive state.

Description will now be given of the operation of the communication system 100 which has the foregoing configuration. A signal for giving an instruction for link disconnection is input to the processing unit 16 of the terminal apparatus 10 which is in connection with the base station apparatus 12 and in an inactive state. The processing unit 16 sets the disconnection request FLAG to ON according to the instruction. The modulation/demodulation unit 18 outputs the signal of an LCH establishment request which includes the disconnection request FLAG. From the signal of the LCH establishment request received, the control signal processing unit 44 detects that the disconnection request FLAG is ON.

The quality derivation unit 38 derives the link quality of the up and down links from the received signal as in ordinary adaptive modulation processing. Based on the disconnection request FLAG of "ON" the modulation mode control unit 36 determines the modulation mode to be the predetermined BPSK, regardless of the link quality derived by the quality derivation unit 38. The modulation/demodulation unit 34 changes the modulation mode to BPSK, and notifies the terminal apparatus 10 of the change of the modulation mode. As a result, the modulation/demodulation unit 18 of the terminal apparatus 10 also changes the modulation mode to BPSK. The terminal apparatus 10 and the base station apparatus 12 perform the processing of disconnecting the terminal apparatus 10 by using the modulation mode changed.

According to the present embodiment, when the terminal apparatus requests the base station apparatus to disconnect, it transmits a signal indicating the request to the base station apparatus. Based on the signal indicating the request, the base station apparatus quits adaptive modulation and determines to use the predetermined modulation mode of high error tolerance. This allows processing of higher stability. In addition, the terminal apparatus and the base station apparatus maintain ordinary sequences therebetween except the addition of the signal indicating the disconnection request. The present embodiment thus has high feasibility.

Second Embodiment

Like the first embodiment, a second embodiment relates to the case where a terminal apparatus in an inactive state disconnects communication with a base station apparatus. To ensure the processing of disconnecting the terminal apparatus, in the first embodiment, the modulation mode determined by adaptive modulation is ignored. For this purpose, the signal indicating a disconnection request is included in the request for time slot allocation which is issued from the terminal apparatus to the base station apparatus. In the second embodiment, on the contrary, the terminal apparatus performs some processing to make the base station apparatus select a modulation mode of high error tolerance, without the addition of the signal indicating a disconnection request.

In the present embodiment, the modulation mode of the up link is determined based on the signal quality measured by the base station apparatus. Then, the terminal apparatus transmitts a signal of reduced intensity at the timing when the base station apparatus measures the signal quality. This makes the signal quality at the, base station apparatus lower than in the actual communication state, and thus the base station apparatus determines to use the modulation mode of higher error tolerance. For the down link, the terminal apparatus measures the quality of a signal received and notifies the base station apparatus of a modulation mode suitable for the measured signal quality is finally determined by the base station apparatus. The terminal apparatus thus notifies, to the base station, a modulation mode having error tolerance higher than that of the modulation mode in which communication can be conducted actually.

Figure 8:
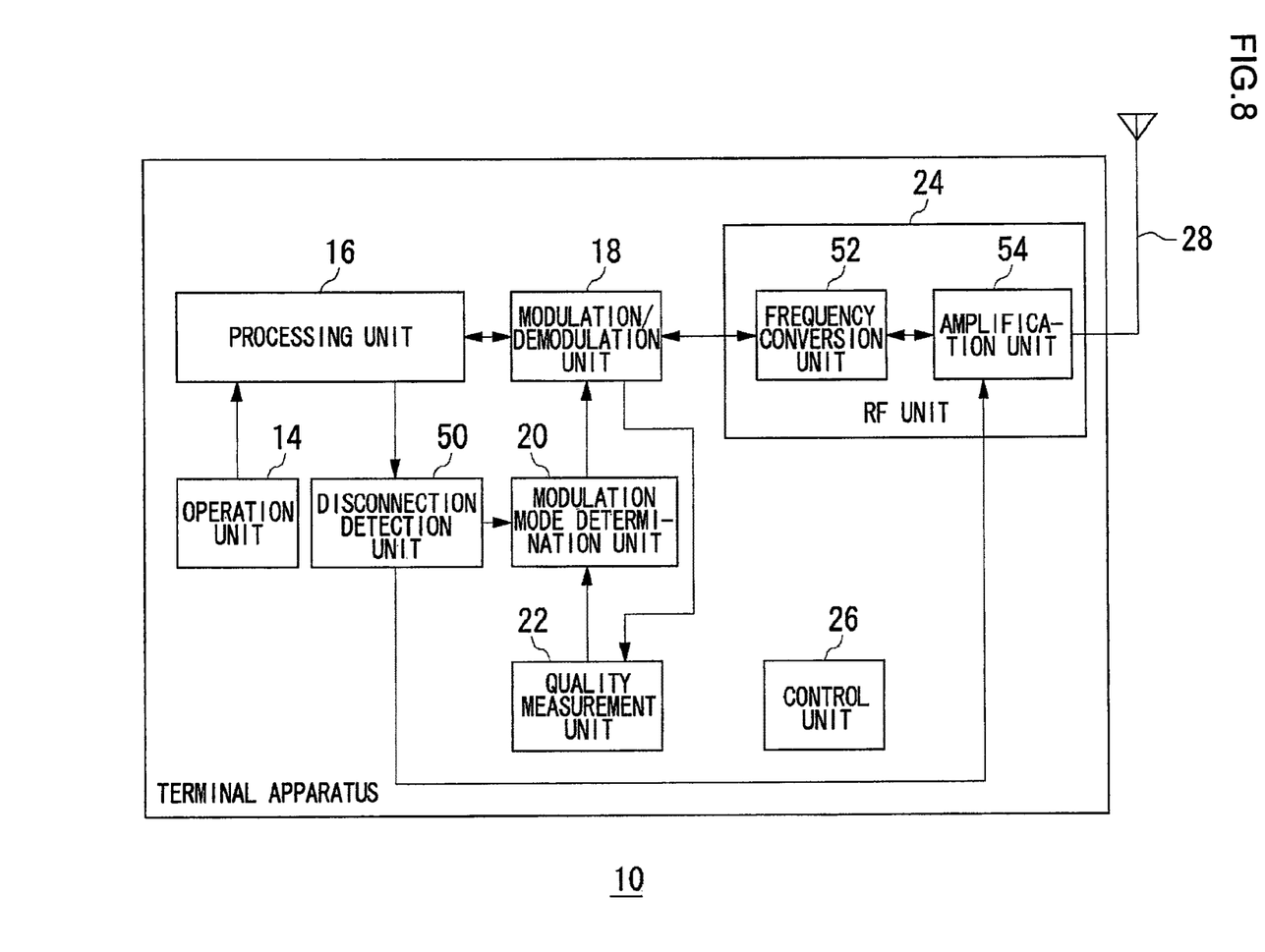
FIG. 8 shows the configuration of a terminal apparatus according to a second embodiment.

FIG. 8 shows the configuration of a terminal apparatus 10 according to the second embodiment. The terminal apparatus 10 of FIG. 8 is the terminal apparatus 10 of FIG. 1 plus a disconnection detection unit 50. Moreover, the RF unit 24 includes a frequency conversion unit 52 and an amplification unit 54.

The processing unit 16, as in FIG. 1, changes the signal that is input from the operation unit 14 into a signal that can be modulated by the modulation/demodulation unit 18. Nevertheless, in contrast to FIG. 1, the processing unit 16 in an inactive state will not generate any signal indicating a disconnection request to be transmitted to the base station apparatus 12 when it receives the signal for giving an instruction for link disconnection from the operation unit 14.

The disconnection detection unit 50, when in an inactive state, detects a signal for giving an instruction for link disconnection out of the signal that is input from the operation unit 14 through the processing unit 16. Based on the detected signal, the disconnection detection unit 50 also issues an instruction for performing processing to be described later on the quality measurement on the up and down links so that both the modulation modes of the up and down links have high error tolerance.

From the signal quality measured by the quality measurement unit 22, the modulation mode determination unit 20 determines the modulation mode suitable for the measured signal quality, and notifies the base station apparatus 12 of the modulation mode determined. In ordinary adaptive modulation, the modulation modes are determined from the measured signal quality by the same method as in FIG. 1. Now, when the signal for giving an instruction for link disconnection is detected by the disconnection detection unit 50, the determined modulation mode described above is changed to a predetermined modulation mode, such as BPSK, under the instruction of the disconnection detection unit 50. Alternatively, the determined modulation mode may be changed to a modulation mode of higher error tolerance. For example, the determined modulation mode of 16 QAM may be changed to π/4-shift QPSK. The modulation mode changed is notified to the base station apparatus 12. Incidentally, the foregoing processing corresponds to processing for changing the modulation mode of the down link to one of higher error tolerance when the signal for giving an instruction for link disconnection is detected.

The frequency conversion unit 52 performs frequency conversion between baseband signals to be processed by the modulation/demodulation unit 18 and radio frequency signals, AD or DA conversion.

The amplification unit 54 amplifies a radio frequency signal to transmit and a radio frequency signal received. Amplifiers corresponding to the two signals may be provided separately. For example, a power amplifier may be provided for the transmission signal, and a low-noise amplifier for the received signal. Here, when the signal for giving an instruction for link disconnection is detected by the disconnection detection unit 50, the disconnection detection unit 50 issues an instruction to reduce the gain of the power amplifier at the timing when the base station apparatus 12 measures the signal quality. Incidentally, the foregoing processing corresponds to processing for changing the modulation mode of the up link to one of higher error tolerance when the signal for giving an instruction for link disconnection is detected.

Figure 9:
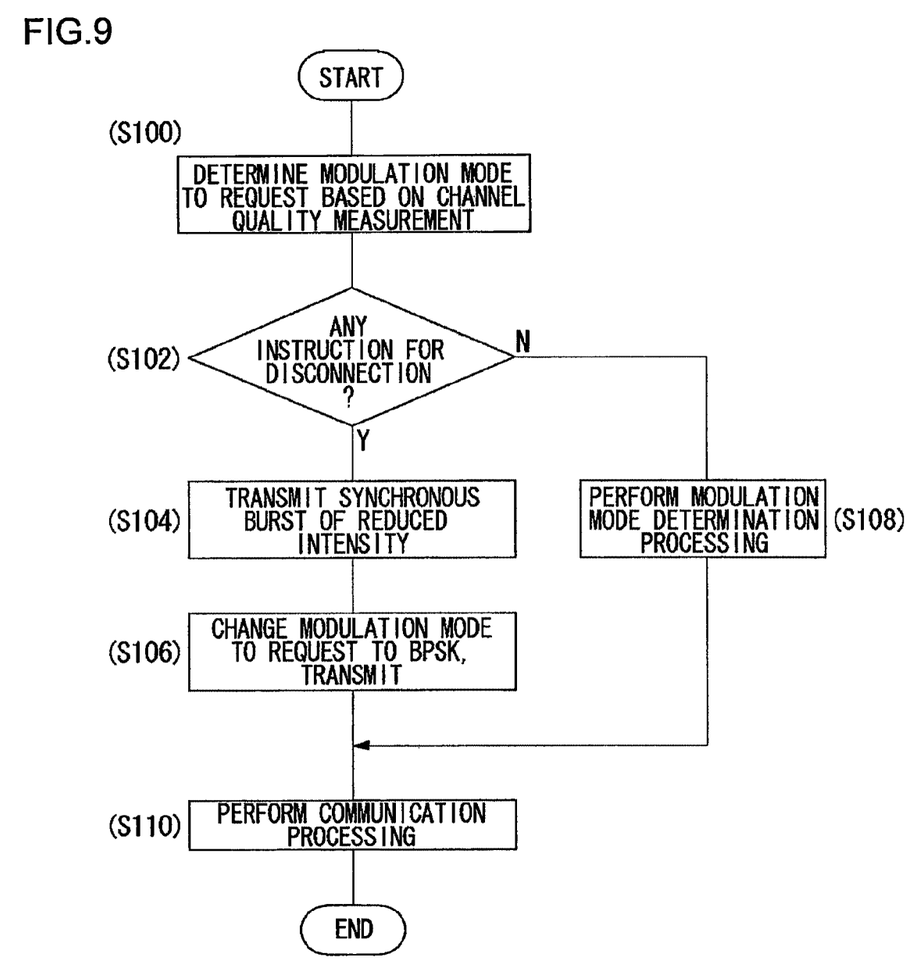
FIG. 9 is a flowchart showing the procedure for determining a modulation mode of FIG. 8.

FIG. 9 is a flowchart showing the procedure through which the terminal apparatus 10 determines a modulation mode. The modulation mode determination unit 20 determines the modulation mode to request of the base station apparatus 12 based on the measurement of the channel quality from the quality measurement unit 22 (S100). When the disconnection detection unit 50 detects the signal for giving an instruction for link disconnection (Y at S102), the amplification unit 54 transmits a synchronous burst of reduced signal intensity to the base station apparatus 12 (S104). The modulation mode determination unit 20 changes the modulation mode to request of the base station apparatus 12 to BPSK, and transmits a signal including the information as to the modulation mode to the base station apparatus 12 (S106). On the other hand, if the disconnection detection unit 50 does not detect any signal for giving an instruction for link disconnection (N at S102), ordinary modulation mode determination processing is executed (S108). Then, the terminal apparatus 10 performs communication processing with the base station apparatus 12, or communication processing for performing link disconnection in particular (S110).

Figure 10:
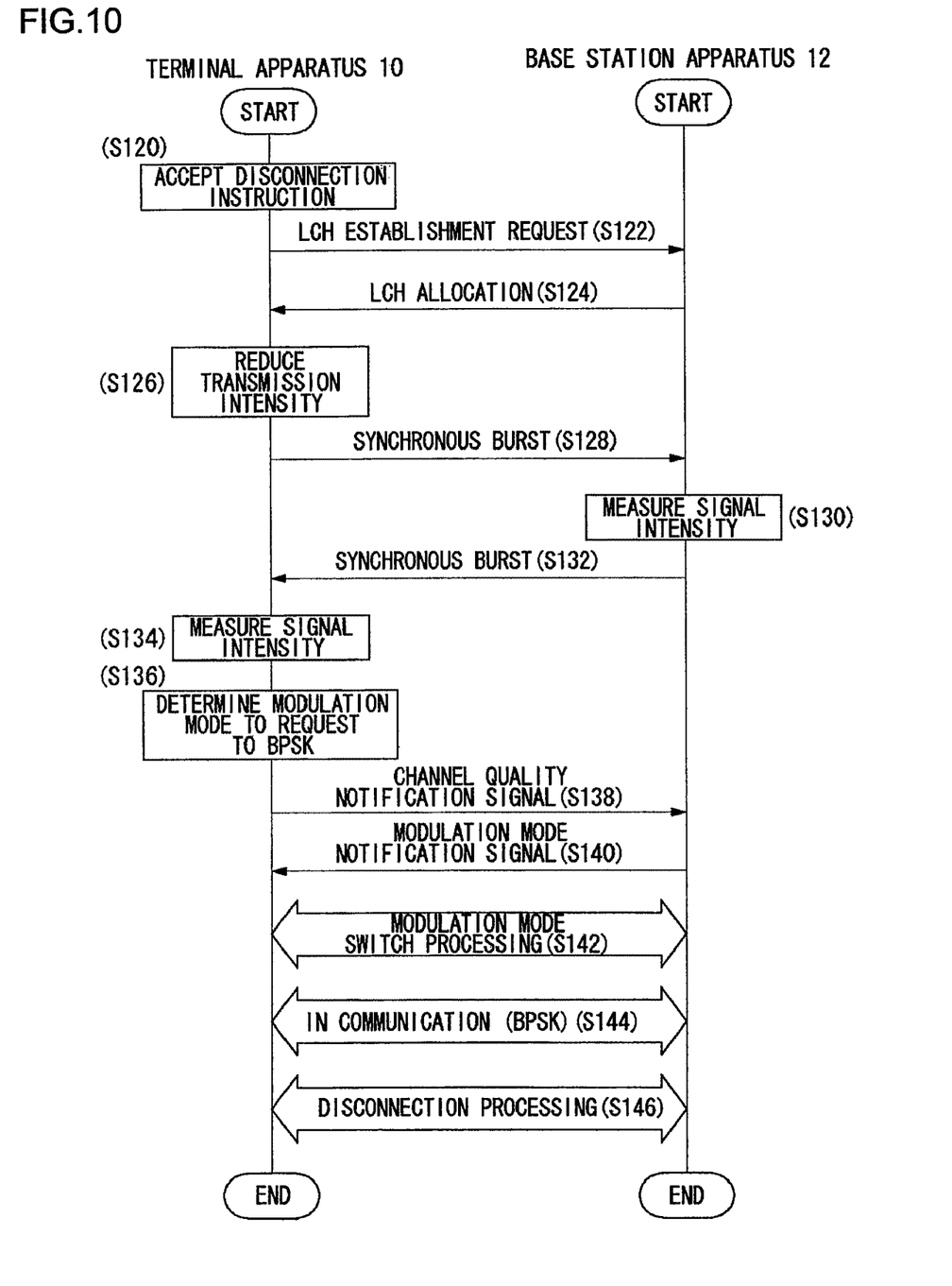
FIG. 10 is a sequence diagram showing disconnection processing of FIG. 8.

FIG. 10 is a sequence diagram showing disconnection processing of FIG. 8. Here, the terminal apparatus 10 shall be in an inactive state. The disconnection detection unit 50 of the terminal apparatus 10 accepts an instruction for link disconnection from the operation unit 14 through the processing unit 16 (S120). The terminal apparatus 10 outputs an LCH establishment request to the base station apparatus 12 (S122). The base terminal apparatus 12 outputs an LCH allocation to the terminal apparatus 10 (S124). The amplification unit 54 reduces the intensity of the transmission signal under the instruction of the disconnection detection unit 50 (S126). With the transmission signal reduced in intensity, the terminal apparatus 10 outputs a synchronous burst to the base station apparatus 12 so as to establish synchronization at upper layers of the communication protocol (S128). To determine the modulation mode of the up link, the quality derivation unit 38 of the base station apparatus 12 measures the signal intensity (S130). The modulation mode control unit 36 determines the modulation mode of the up link suitable for the measured signal intensity. The base station apparatus 12 also outputs a synchronous burst response to the terminal apparatus 10 (S132).

As with ordinary data communication, the quality measurement unit 22 of the terminal apparatus 10 measures the channel quality which is necessary for adaptive modulation (S134). Under the instruction of the disconnection detection unit 50, however, the terminal apparatus 10 determines the modulation mode to request of the base station apparatus 12 to be the predetermined BPSK (S136). The terminal apparatus 10 transmits the determined modulation mode to the base station apparatus 12 as a channel quality notification signal (S138). Based on the channel quality notification signal, the modulation mode control unit 36 of the base station apparatus 12 determines the modulation mode of the down link to be BPSK, and transmits a modulation mode notification signal to the terminal apparatus 10 (S140). To switch the modulation mode, the terminal apparatus 10 and the base station apparatus 12 perform modulation mode switch processing therebetween, including resynchronization processing (S142). Subsequently, the terminal apparatus 10 and the base station apparatus 12 communicate by using BPSK (S144). Then, the terminal apparatus 10 performs disconnection processing (S146).

Description will now be given of the operation of the communication system 100 which has the foregoing configuration. A signal for giving an instruction for link disconnection is input to the processing unit 16 of the terminal apparatus 10 which is in connection with the base station apparatus 12 and in an inactive state. The disconnection detection unit 50 detects this instruction, and outputs predetermined instruction signals to the modulation mode determination unit 20 and the amplification unit 54. The amplification unit 54 outputs a signal of reduced intensity in transmitting a synchronous burst for the base station apparatus 12 to measure the channel quality. The quality derivation unit 38 receives the signal of reduced intensity, and measures the channel quality of the signal received. The modulation mode control unit 36 determines the modulation mode of the up link based on the measurement.

Moreover, the modulation mode determination unit 20 determines the modulation mode to request of the base station apparatus 12 to be BPSK, regardless of the channel quality measured by the quality measurement unit 22. The terminal apparatus 10 notifies the base station apparatus 12 of the modulation mode to request. The modulation mode control unit 36 determines the modulation mode of the down link according to the request. The modulation/demodulation unit 34 changes the modulation mode to BPSK, and notifies the terminal apparatus 10 of the change of the modulation mode. The modulation/demodulation unit 18 also changes the modulation mode to BPSK. The terminal apparatus 10 and the base station apparatus 12 perform the processing of disconnecting the terminal apparatus 10 by using the modulation mode changed.

According to the present embodiment, it is possible to quit adaptive modulation processing and change the modulation mode to the predetermined one having high error tolerance without the addition of a new signal to between the terminal apparatus and the base station signal. This allows processing of still higher stability. Furthermore, the present embodiment can be achieved by adding a new function to the terminal apparatus while providing the base station apparatus with facilities capable of adaptive modulation alone. This means high feasibility.

The present invention has been described based on the embodiments which are only exemplary. It is understood by those skilled in the art that there exist other various modifications to the combination of each component and process described above and that such modifications are encompassed by the scope of the present invention.

In the first embodiment, the processing unit 16 generates a signal which indicates a disconnection request. This is not restrictive, however. For example, the processing unit 16 may generate an important message such as an emergency message, or a message having a small amount of data. According to this modification, predetermined data can be transmitted with higher reliability. In other words, what is generated by the processing unit 16 has only to be information to be prevented from adaptive modulation.

In the first and second embodiments, the communication system 100 is targeted for the Personal Handyphone System. This is not restrictive, however. For example, TDMA-based cellular mobile phone systems and the like are also applicable. According to this modification, the present invention can be applied to various communication systems. In other words, what is essential is only that channels allocated to terminal apparatuses have some temporal limitations. Here, the "channels" refer to wireless communication channels that are established for the sake of communication between a base station apparatus and wireless apparatuses such as a terminal apparatusespecifically, they refer to certain frequency bands in the case of FDMA (Frequency Division Multiple Access), certain time slots or slots in the case of TDMA (Time Division Multiple Access), and certain code series in the case of CDMA (Code Division Multiple Access).

In the first and second embodiments, the modulation/demodulation unit 18, the modulation mode determination unit 20, the modulation/demodulation unit 34, and the modulation mode control unit 36 handle different modulation modes, such as BPSK and 16 QAM, for different transmission rates. This is not restrictive, however. For example, different transmission rates may be achieved through different encoding rates of error correction. The modulation modes and the encoding rates of error correction may be manipulated in combination. According to this modification, finer settings can be made of the transmission rate. In other words, what is essential is only that a plurality of transmission rates be achieved.

In the first and second embodiments, the modulation modes of the up and down links are controlled separately by the modulation mode determination unit 20, the quality measurement unit 22, the modulation mode control unit 36, and the quality derivation unit 38. This is not restrictive, however. For example, while the quality derivation unit 38 measures the channel quality of the up link from the received signal, the modulation mode control unit 36 may determine a modulation mode common to the up and down links based on the channel quality measured. Otherwise, based on the single channel quality measured by the quality derivation unit 38, the modulation mode control unit 36 may determine both the modulation modes of the up and down links by using threshold values provided for the up and down links separately. According to this modification, it is possible to reduce the processing necessary to determine the modulation modes. In other words, what is essential is only that the modulation modes be determined based on actual channel quality.

Although the present invention has been described by way of exemplary embodiments, it should be understood that many changes and substitutions may further be made by those skilled in the art without departing from the scope of the present invention which is defined by the appended claims.

What is claimed is:

1. A base station apparatus comprising:
a communication unit which communicates with a predetermined terminal apparatus at variable transmission rates;
a detection unit which detects, out of signals received from the terminal apparatus, a request signal for communicating information of high priority during part of a communication period with the terminal apparatus, and further analyzes the contents of the request signal detected; and
a transmission rate determination unit which determines a transmission rate for the terminal apparatus during the part of the communication period with the terminal apparatus, based on the contents of the request signal for communicating information of high priority,
wherein when the request signal for communicating information of high priority, detected by the detection unit is a signal indicating a request for communication disconnection, the transmission rate determination unit determines the transmission rate for the terminal apparatus to be a transmission rate of higher error tolerance.

2. A base station apparatus comprising:
a communication unit which communicates with a predetermined terminal apparatus at variable transmission rates;
a detection unit which detects, out of signals received from the terminal apparatus, a request signal for communicating information of high priority during part of a communication period with the terminal apparatus;
a channel quality derivation unit which derives channel quality with respect to the terminal apparatus; and
a transmission rate determination unit which determines a transmission rate for the terminal apparatus during the part of the communication period with the terminal apparatus, based on either of the derived channel quality and predetermined transmission rate depending on the presence or absence of the request signal for communicating information of high priority,
wherein when the request signal for communicating information of high priority, detected by the detection unit is a signal indicating a request for communication disconnection, the transmission rate determination unit determines the transmission rate for the terminal apparatus to be a transmission rate of higher error tolerance.

3. A terminal device comprising:
a communication unit which transmits a signal for requesting time slot allocation to a base station apparatus while the base station apparatus frees a time slot and maintains upper layers of a communication protocol;
a processing unit which causes, after the time slot is allocated by the base station apparatus to which the communication unit transmitted the signal for requesting allocation, the communication unit to transmit a signal with a predetermined signal intensity to cause the base station apparatus to determine a transmission rate in an up-line;
a channel quality measurement unit which measures channel quality with respect to the base station apparatus via the communication unit;
a transmission rate derivation unit which derives and determines a transmission rate candidate in a down-line for the base station apparatus based on the channel quality measured by the channel quality measurement unit, and which causes the communication unit to transmit the derived transmission rate candidate to the base station apparatus, wherein
the processing unit causes, when receiving a signal for giving an instruction for line disconnection, the communication unit to transmit the signal with an intensity smaller than the predetermined signal intensity,
the transmission rate derivation unit determines, of the transmission rates available in the communication unit, a transmission rate of higher error tolerance as a transmission rate candidate in a down-line and causes the determined transmission rate candidate to be transmitted to the base station apparatus.

4. A transmission rate determination method comprising:
detecting, out of signals received from a terminal apparatus to communicate with at variable transmission rates, a request signal for communicating information of high priority during part of a communication period with the terminal apparatus, if any, and further analyzing contents of the request signal detected; and
determining a transmission rate for the terminal apparatus during the part of the communication period with the terminal apparatus, based on the contents of the request signal,
wherein when the request signal for communicating information of high priority in the step of detecting a request signal is a signal indicating a request for communication disconnection, the step of determining a transmission rate determines the transmission rate for the terminal apparatus to be a transmission rate of higher error tolerance.

5. A transmission rate determination method comprising:
detecting, out of signals received from a terminal apparatus to communicate with at variable transmission rates, a request signal for communicating information of high priority during part of a communication period with the terminal apparatus, if any;
deriving channel quality with respect to the terminal apparatus; and
determining a transmission rate for the terminal apparatus during the part of the communication period with the terminal apparatus, based on either of the derived channel quality and a predetermined transmission rate depending on the presence or absence of the request signal,
wherein when the request signal for communicating information of high priority in the step of detecting a request signal is a signal indicating a request for communication disconnection, the step of determining a transmission rate determines the transmission rate for the terminal apparatus to be a transmission rate of higher error tolerance.

6. A computer readable storage medium having a program causing a computer to perform the steps of:

detecting, out of signals received over a wireless network from a terminal apparatus to communicate with at variable transmission rates, a request signal for communicating information of high priority during part of a communication period with the terminal apparatus, if any, and further analyzing contents of the request signal detected; and determining a transmission rate for the terminal apparatus during the part of the communication period with the terminal apparatus, based on the contents of the request signal, wherein when the request signal for communicating information of high priority in the step of detecting a request signal is a signal indicating a request for communication disconnection, the step of determining a transmission rate determines the transmission rate for the terminal apparatus to be a transmission rate of higher error tolerance than the one stored in the memory.

7. A computer readable storage medium having a program causing a computer to perform the steps of:

detecting, out of signals received over a wireless network from a terminal apparatus to communicate with at variable transmission rates, a request signal for communicating information of high priority during part of a communication period with the terminal apparatus, if and deriving channel quality with respect to the terminal apparatus; and determining a transmission rate for the terminal apparatus during the part of the communication period with the terminal apparatus, based on either of the derived channel quality and a predetermined transmission rate previously stored in a memory depending on the presence or absence of the request signal, wherein when the request signal for communicating information of high priority in the step of detecting a request signal is a signal indicating a request for communication disconnection, the step of determining a transmission rate determines the transmission rate for the terminal apparatus to be a transmission rate of higher error tolerance than the one stored in the memory.

* * * * *